US 8,767,330 B2
Jul. 1, 2014

(12) United States Patent
Heineman et al.

(10) Patent No.: US 8,767,330 B2
(45) Date of Patent: Jul. 1, 2014

(54) TAPE CARTRIDGE AUXILIARY MEMORY BASED LIBRARY

(75) Inventors: Ray D. Heineman, Longmont, CO (US); Samuel J. Guleff, Superior, CO (US); Matthew Thomas Starr, Lafyette, CO (US); Michael Jerard Goberis, Broomfiled, CO (US); Walter Wong, Boulder, CO (US)

(73) Assignee: Spectra Logic, Corp., Boulder, CO (US)

( * ) Notice: Subject to any disclaimer, the term of this patent is extended or adjusted under 35 U.S.C. 154(b) by 210 days.

(21) Appl. No.: 13/248,207

(22) Filed: Sep. 29, 2011

(65) Prior Publication Data

US 2012/0019949 A1  Jan. 26, 2012

Related U.S. Application Data

(60) Continuation of application No. 12/897,469, filed on Oct. 4, 2010, now abandoned, which is a division of application No. 11/877,645, filed on Oct. 23, 2007, now abandoned, which is a continuation-in-part of application No. 10/604,118, filed on Jun. 26, 2003, now Pat. No. 7,359,142.

(51) Int. Cl.
*G11B 15/06* (2006.01)
*G11B 15/68* (2006.01)

(52) U.S. Cl.
USPC .................................. 360/55; 360/69; 360/71

(58) Field of Classification Search
None
See application file for complete search history.

(56) References Cited

U.S. PATENT DOCUMENTS

| 5,950,230 | A | 9/1999 | Islam et al. |
| 6,425,042 | B1 | 7/2002 | Ikeda et al. |
| 7,080,203 | B2 | 7/2006 | Emberty et al. |
| 7,277,246 | B2 * | 10/2007 | Barbian et al. ................ 360/69 |
| 7,301,718 | B2 * | 11/2007 | Ballard ........................ 360/69 |
| 7,386,667 | B2 * | 6/2008 | Estelle et al. ................ 711/114 |
| 7,480,113 | B2 * | 1/2009 | Evans ............................ 360/69 |
| 7,626,778 | B2 * | 12/2009 | Evans ............................ 360/69 |
| 7,630,164 | B2 * | 12/2009 | Sasaki ........................ 360/92.1 |
| 7,676,445 | B2 * | 3/2010 | Fry et al. ....................... 706/52 |
| 7,681,048 | B2 * | 3/2010 | Starr et al. .................... 713/193 |
| 7,809,990 | B2 * | 10/2010 | Sasaki .......................... 714/42 |
| 2003/0090829 | A1 | 5/2003 | Johnson et al. |
| 2004/0078666 | A1 | 4/2004 | Aasheim et al. |
| 2004/0105187 | A1 | 6/2004 | Woodruff et al. |
| 2004/0223253 | A1 | 11/2004 | Woodruff et al. |
| 2004/0264037 | A1 | 12/2004 | Downey et al. |
| 2004/0264038 | A1 | 12/2004 | Heineman et al. |

(Continued)

OTHER PUBLICATIONS

The seventh edition of the *IBM TotalStorage LTO Ultrium Tape Drive SCSI Reference* (Jun. 2007).

*Primary Examiner* — Wayne Young
*Assistant Examiner* — James L Habermehl
(74) *Attorney, Agent, or Firm* — Kenneth Altshuler

(57) ABSTRACT

A data storage library is described including a plurality of tape cartridges wherein each of the tape cartridges possesses an auxiliary radio frequency memory device in which auxiliary digital data is stored. The library also includes at least one drive disposed substantially within the library capable of transferring user data to and from one of the tapes. The library further includes at least one auxiliary radio frequency memory device reader that capable of reading the auxiliary digital data and transmitting the auxiliary digital data to at least one designated location, the reader is independent of the at least one drive.

24 Claims, 13 Drawing Sheets

(56) References Cited

U.S. PATENT DOCUMENTS

| | | |
|---|---|---|
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2005/0007692 A1 | 1/2005 | Thompson et al. |
| 2005/0052772 A1 | 3/2005 | Barbian et al. |
| 2006/0082916 A1* | 4/2006 | Evans .......................... 360/69 |
| 2006/0085595 A1* | 4/2006 | Slater ........................ 711/114 |
| 2006/0164928 A1 | 7/2006 | Starr et al. |
| 2006/0198737 A1 | 9/2006 | Matsui et al. |
| 2007/0195447 A1 | 8/2007 | Starr et al. |
| 2008/0037160 A1 | 2/2008 | McIntosh et al. |
| 2009/0164714 A1* | 6/2009 | Wideman et al. ............. 711/111 |

* cited by examiner

| Serial No. AAA Load Count | Drive 1 | Drive 2 | Drive 3 | Drive 4 |
|---|---|---|---|---|
| 1 | | 0 | | |
| 2 | | | 6 | |
| 3 | 0 | | | |
| 4 | | | | 0 |
| 5 | | | 6 | |
| 6 | 0 | | | |
| 7 | | 0 | | |
| 8 | | | 6 | |

FIG. 6C

TAPE CARTRIDGE AUXILIARY MEMORY BASED LIBRARY

CROSS-REFERENCE TO RELATED APPLICATIONS

This application is a continuation application of U.S. Ser. No. 12/897,469, which is a divisional application of U.S. Ser. No. 11/877,645, filed Oct. 23, 2007, which is a continuation in part of U.S. Ser. No. 10/604,118, filed Jun. 26, 2003, the entire disclosures of which are incorporated herein by reference.

BACKGROUND OF THE INVENTION

1. Field of the Invention

The present invention relates generally to tape libraries using auxiliary memory devices contained in tape storage cartridges in tape libraries.

2. Description of Related Art

Data storage libraries, such as tape libraries, are typically used to store and retrieve large amounts of data for data manipulation and archiving purposes. These libraries are generally comprised of drive devices adapted to read and write data to and from tape cartridges that are often housed within the tape libraries. In the interest of obtaining cursory information about a specific tape cartridge without requiring a time-consuming media load and tape threading process to read the on-tape index file, techniques using holes arranged in patterns in the cartridge casing and later electrical pads grounded in a variety of combinations were introduced. The holes and/or electrical pads provided simple information such as tape capacity, manufacturer, etc. Today, these techniques are yielding to the introduction of Radio Frequency chips disposed in the tape cartridges called a Memory-In-Cartridge (MIC) or Medium Auxiliary Memory (MAM), because of increased amounts of information and ease of use. FIG. 1A shows an example of a tape cartridge 100, tape medium 102, and MIC 104, shown here in dashed lines because the MIC 104 and tape medium 102 reside in the interior of the cartridge 100. In this example, the MIC is disposed in an LTO-3 cartridge which can be provided by TDK Corp. of Tustin, Calif.

A MIC allows the tape drive to access valuable cartridge data without the use of a physical connection, reducing connector wear for both the drive and the media. The MIC is a memory chip built into the data cartridge that provides a direct and immediate connection to the drive's on-board processors, which speeds access to information related to the data cartridge such as system logs, for example. Information and file search parameters are formatted within the MIC system effectively cutting the data access time down to a fraction from historical techniques.

As shown in FIG. 1B, a MIC 104 fundamentally comprises an integrated circuit that includes solid state memory and a transponder 124 attached to an antenna 126, the antenna is typically a small coil of wires. The MIC 104 is considered a passive device because it is energized when subjected to a strong enough RF field produced by a MIC-Reader. Information can be transmitted between the MIC and the MIC-Reader via a specific radio frequency.

Currently a MIC, or MAM, is parceled into regions for a medium, device and host. The three regions can accommodate attributes related to a medium with a MIC. For example a medium attribute can be a serial number permanently stored in the MAM during manufacturing, a device attribute can be load count maintained by the tape drive and a host attribute can be a backup date maintained by the application client. These attributes are strictly read and written to by a reader disposed in a drive.

In an effort to expand capabilities of a storage element containing a MIC operable with a data storage unit beyond a tape drive both methods and apparatus are disclosed herein. It is to innovations related to this subject matter that the claimed invention is generally directed.

SUMMARY OF THE INVENTION

The present invention relates generally to tape libraries using auxiliary memory devices contained in tape storage cartridges in tape libraries that overcomes the disadvantages and limitations of the prior art by using at least one radio frequency memory device to read auxiliary memory devices that is independent of that which is used in a tape drive.

One embodiment of the present invention can therefore comprise a data storage library comprising: a plurality of tape cartridges wherein each of the tape cartridges possesses an auxiliary radio frequency memory device in which auxiliary digital data is stored; at least one drive disposed substantially within the library capable of transferring user data to and from one of the tapes; at least one auxiliary radio frequency memory device reader that capable of reading the auxiliary digital data and transmitting the auxiliary digital data to at least one designated location, the reader is independent of the at least one drive.

Other embodiments of the present invention may additionally comprise a data storage library comprising: a first tape cartridge possessing a first auxiliary radio frequency memory device, the first device containing first attribute data relating to at least a first historical event associated with the first tape cartridge; a second tape cartridge possessing a second auxiliary radio frequency memory device, the second device containing second attribute data relating to at least a second historical event associated with the second tape cartridge; at least one drive disposed substantially within the library that capable of transferring user data to and from the first tape cartridge and to and from the second tape cartridge; at least one auxiliary radio frequency memory device reader independent of the drive capable of reading the first and second attribute data; a designated memory device capable of receiving the first and second attribute data from the reader; and an algorithm adapted to manipulate the first and second attribute data received by the designated memory device.

Yet further embodiments of the present invention may comprise a method comprising the steps of: providing a library with a tape drive, a tape drive auxiliary memory reader and writer device associated with the tape drive, a auxiliary memory reader device independent of the tape drive, a designated cumulative auxiliary storage location, and a first tape cartridge that possesses a first auxiliary memory device; loading the first tape cartridge in the tape drive for a first time; recording that the first tape cartridge has been loaded into the tape drive for the first time as a first loading event wherein the recording is to the first auxiliary memory device via the tape drive auxiliary memory reader and writer device; unloading the first tape cartridge from the tape drive; reading the first loading event from the first auxiliary memory device via the auxiliary memory reader device independent of the tape drive; transmitting the first loading event from the auxiliary memory reader device independent of the tape drive to the designated cumulative auxiliary storage location; and recording the first loading event in the designated cumulative auxiliary storage location.

BRIEF DESCRIPTION OF THE DRAWINGS

FIG. 6A-6C shows various embodiments of a displayed data table pertaining to performance and/or historical event related information relative to that recorded on auxiliary radio frequency memory devices in accordance with an embodiment of the present invention.

DETAILED DESCRIPTION

Figure 2A:
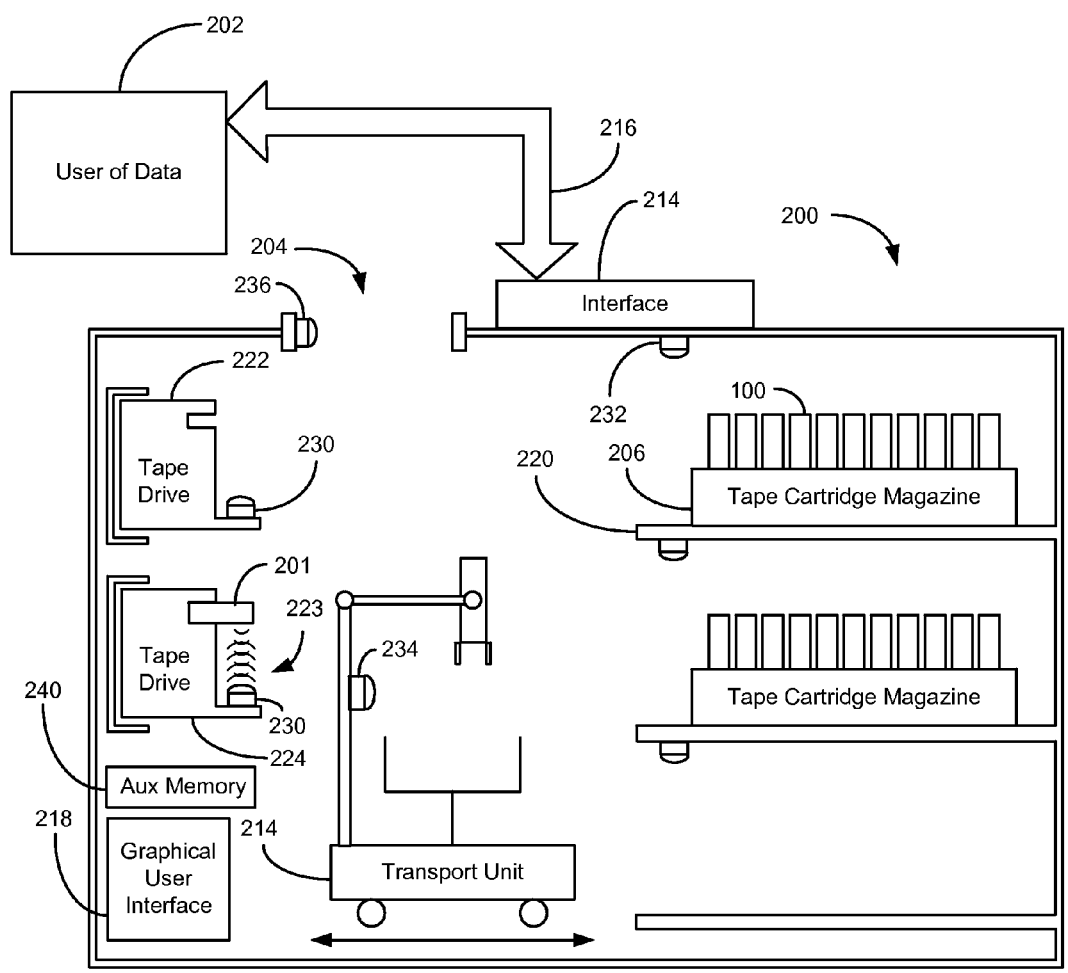
FIG. 2A is an illustration of a data storage arrangement constructed in accordance with an embodiment of the present invention.

Referring to the drawings in general, and more specifically to FIG. 2A, shown therein is an illustration of a data storage arrangement constructed in accordance with an embodiment of the present invention. In what follows, similar or identical structures may be identified using identical callouts.

Figure 1A:
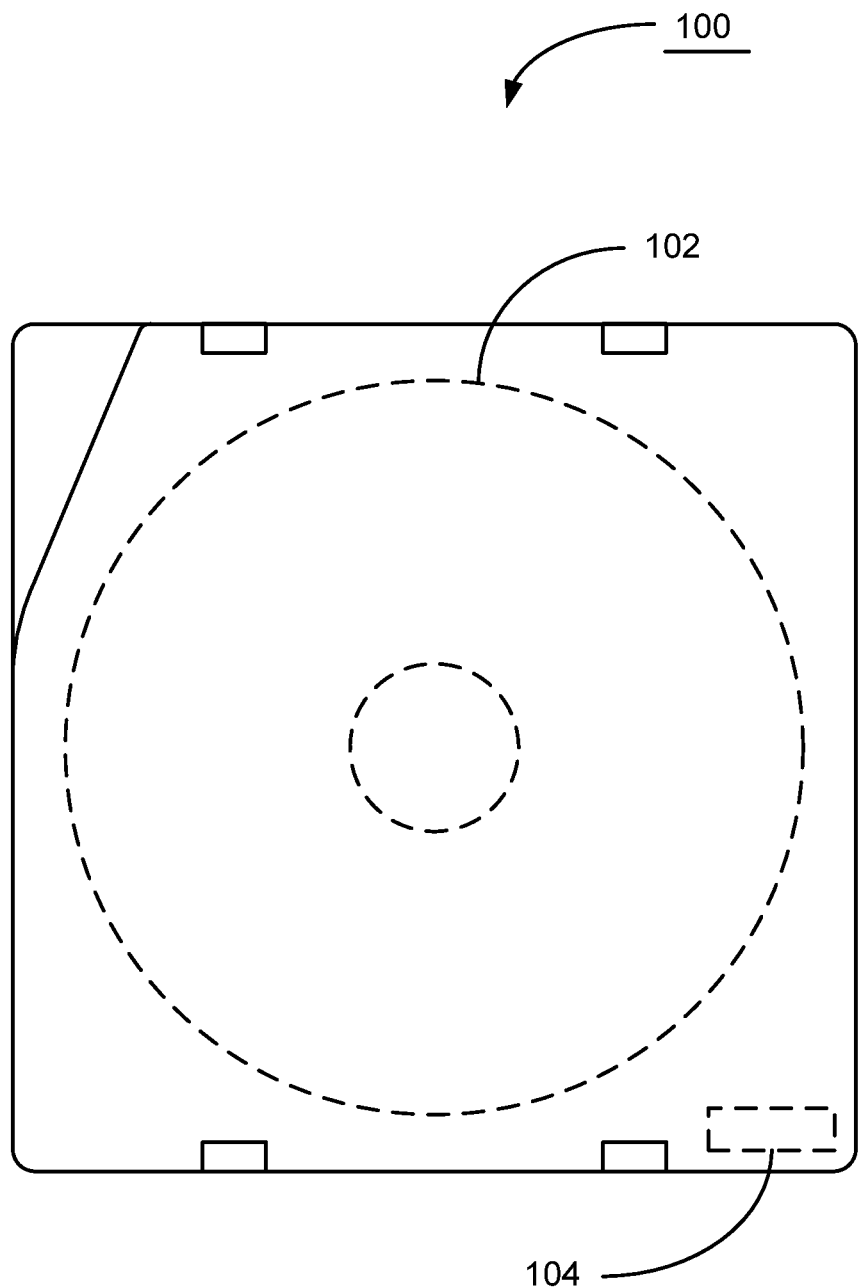
FIG. 1A is a prior art pictorial representation of a tape cartridge with an auxiliary radio frequency memory device.
Figure 1B:
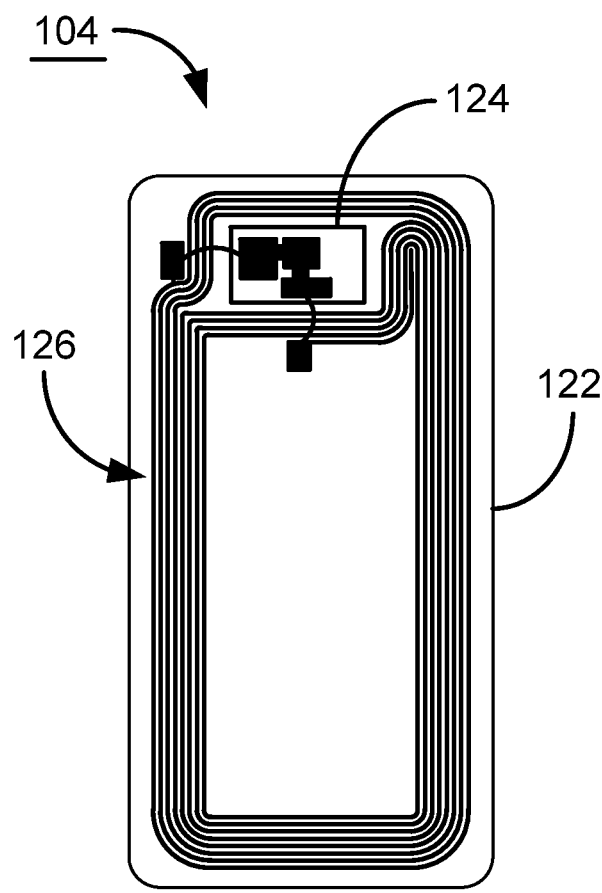
FIG. 1B is a prior art pictorial representation of an auxiliary radio frequency memory device.

The data storage arrangement illustrated in FIG. 2A can comprise a user of data 202, such as a client, in communication with a data storage library 200. As illustratively shown, the client 202 is in communication with the library 200 via a communication path 216 and a library interface device 214. The library 200 comprises a plurality of tape cartridges 100 disposed in a tape cartridge magazine 206 wherein each of the tape cartridges contains an auxiliary radio frequency memory device (not shown) capable of storing auxiliary digital data, such as the MIC 104 of FIG. 1B. In this embodiment, the library 200 also comprises several tape drives 222 and 224, each capable of reading and writing data to and from one of a plurality of tape cartridges 100. Each tape drive 222 and 224 can be associated with a tape drive radio frequency memory device 230. As shown here, the loaded tape drive 224 is in radio frequency communication 223 with the auxiliary radio frequency memory device 104 (not shown) associated with tape cartridge 201 via the tape drive radio frequency memory device 230 associated with tape drive 224. The library 200 can further comprise a shelving system 220 capable of archiving the tape cartridge magazines 206 within the library 200. In this embodiment, the shelving system 220 is associated with one or more auxiliary radio frequency memory device readers 232 is capable of at least reading data stored on an auxiliary radio frequency memory device 104 contained by each tape cartridge 100. A transport unit 214 comprises means to transport a tape cartridge magazine 206 from the shelf system 220 to a location that facilitates a tape cartridge 100 to be inserted in one of the drives 222 or 224, such as tape cartridge 201 in a cooperating relationship with drive 224 to read and write data as shown. The transport device 214 can optionally be associated with at least one auxiliary radio frequency memory device reader 234, as shown here, disposed on the transport unit 214. The auxiliary radio frequency memory device reader 234 is one example of a reader independent of a tape drive's reader 230. The library 200 also optionally comprises an entry/exit port 204 whereby tape cartridges 100 or tape cartridge magazines 206 can be transferred between an environment external to the library 200 and an environment internal to the library 200. As shown here, preferably at least one auxiliary radio frequency memory device reader 236 is associated with the entry/exit port 204. In this embodiment, the library 200 can accommodate a graphical user interface 218 and an auxiliary memory 240, such as a disk drive or solid state memory device, capable of storing relevant information related to each tape 100. The auxiliary memory device 240 and/or graphical user interface 218 are linked to each reader, such as the reader 230, via a linking means such as a cable or some other wireless device for example, through which a reader, such as the reader 230, transmits the information stored on an auxiliary radio frequency memory device 104. In one embodiment, the tape cartridges 100 or the tape cartridge magazines 206 may be associated with different users of data such that the storage space in the library 200 is partitioned into two or more parts wherein each part is associated with the different user of data for example.

Figure 2B:
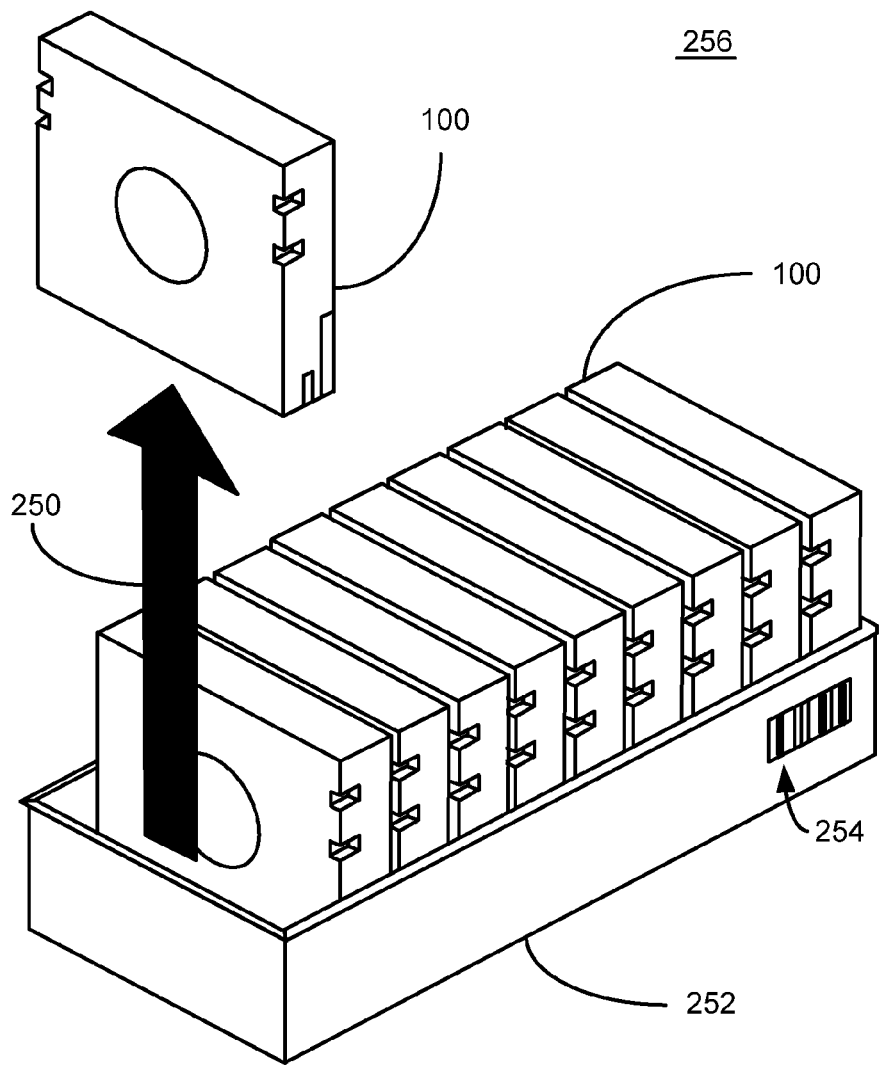
FIG. 2B is an illustration of a populated tape cartridge magazine in accordance with an embodiment of the present invention.

With reference to FIG. 2B, shown therein are tape cartridges 100 supported by a tape cartridge magazine 206. In more detail, a tape cartridge 100, such as an LTO3 category tape cartridge manufactured by IBM of Armonk, N.Y., comprises magnetic tape that is capable of storing digital data written by a compatible drive 222 or 224, such as an LTO tape drive manufactured by IBM, when in cooperation (i.e. loaded) with the tape cartridge 201 as shown in FIG. 2A. The tape cartridge magazine 206 is shown populated with a plurality of tape cartridges 100. A tape cartridge 100 can be removed from the tape cartridge magazine 206, as shown by the arrow 250, and inserted in to the tape drive 222 or 224 by means of a picker device 402, shown in FIG. 4. Disposed on the tape cartridge magazine 206 is a bar code identifier 254, or other identifying indicia, for identifying the tape cartridge magazine 206 which has utility should the tape cartridge magazine 206 be archived in a media pack storage vault, for example. In this embodiment, all tape cartridges 100 contain an auxiliary radio frequency memory device 104, however, in alternative embodiments, some tape cartridges may not contain an auxiliary radio frequency memory device 104.

An auxiliary radio frequency memory device 104, in one embodiment, is parceled into three regions in which data can be stored; a medium device region which contains information such as a serial number, a device region which contains information from the tape drive such as load count, and host/vendor unique region wherein information such as history and/or performance data related to the cartridge 100 can be stored. The information in the regions can be added to with new information via an address related to the arrangement of available storage space in the auxiliary radio frequency memory device 104 or, optionally, the information can be read by an auxiliary memory reader, such as the reader 230, and reassembled with additional information and stored on the auxiliary radio frequency memory device 104 as the reassembled version, just to name two examples. In another example, if the storage limit is reached in the auxiliary radio frequency memory device 104, such as the host/vendor data in the host/vendor unique region, the host/vendor data can be read and stored in an auxiliary storage space, such as the auxiliary memory 240, and the host/vendor unique region purged and made available for new information. In another example, the host/vendor data can be compressed with algorithms to decompress residing in the library 200 or user of data 202, for example.

Figure 3:
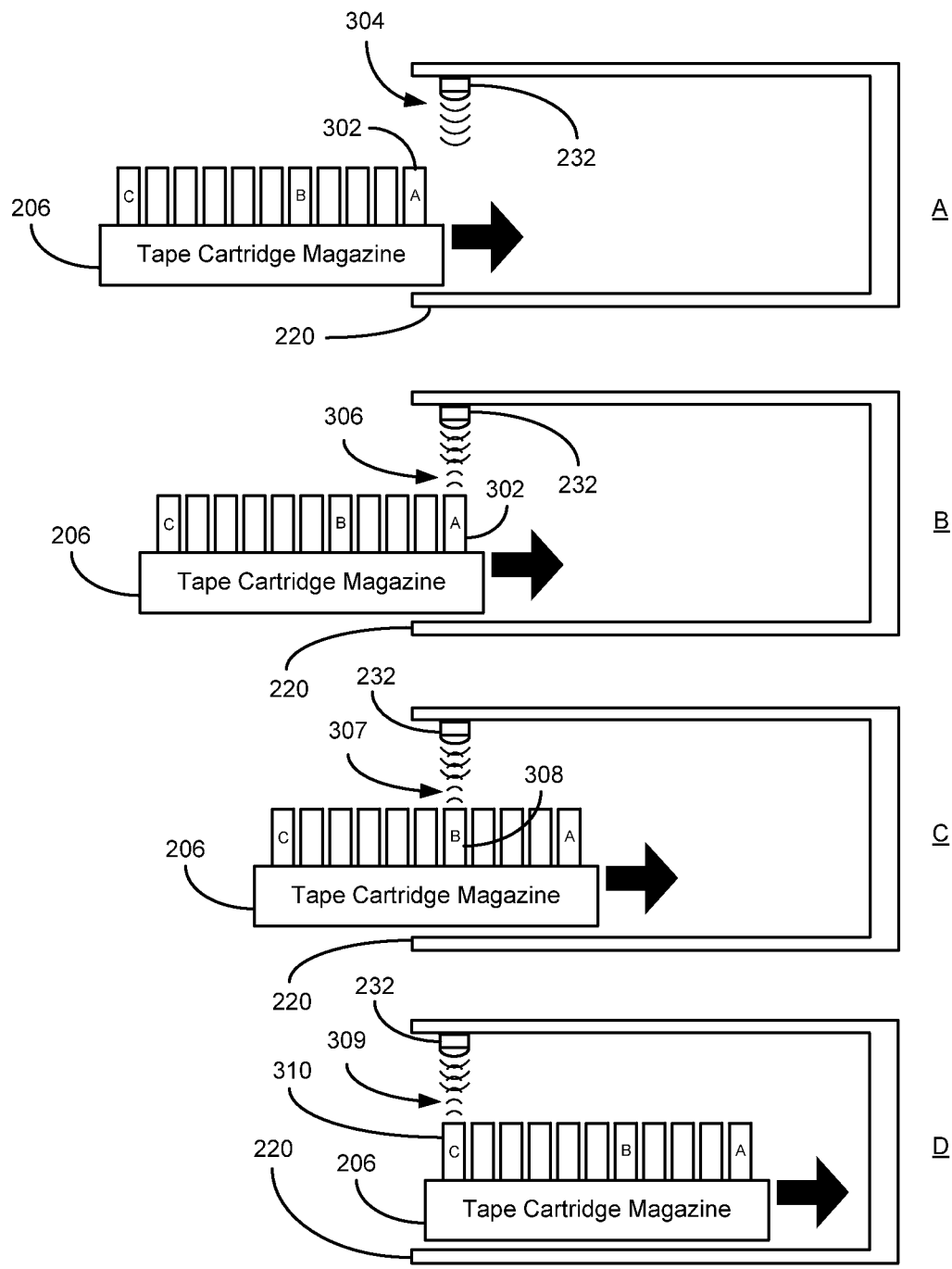
FIG. 3 is an illustration an embodiment of a shelf system that comprises an auxiliary memory reader that can be used in combination with a loaded tape cartridge magazine in accordance with an embodiment of the present invention.

FIG. 3 illustrates an embodiment of a shelf system 220 that comprises an auxiliary memory reader 232 that can be used in combination with a loaded tape cartridge magazine 206. As illustratively shown in arrangement-A, the tape cartridge magazine 206 is in the process of being moved on to the shelf 220 in the direction of the arrow. The auxiliary memory reader 232 is shown transmitting an RF field 304 via an auxiliary radio frequency memory device 104 contained in cartridge A 302. Arrangement-B illustrates the auxiliary radio frequency memory device 104 contained in tape cartridge A 302 transmitting data in the form of an RF signal 306 to the auxiliary memory reader 232 when positioned in the presence of the RF field 304. In one embodiment of the present invention, the auxiliary radio frequency memory device 104 is a passive device because it is energized when subjected to a strong enough RF field produced by the auxiliary memory reader 232. Information is transmitted between the auxiliary radio frequency memory device 104 and the auxiliary memory reader 232 via a specific radio frequency, shown here as 304 and 306. Data can be transferred and stored on the auxiliary radio frequency memory device 104 from the library 200 or alternatively (and in addition to) data from the auxiliary radio frequency memory device 104 can be transferred to the auxiliary memory 240 via the auxiliary memory reader 232. Arrangement-C illustrates the auxiliary radio frequency memory device 104 contained in tape cartridge B 308 transmitting data in the form of an RF signal 307 to the auxiliary memory reader 232 when positioned in the presence of the RF field 304. Arrangement-D illustrates the auxiliary radio frequency memory device 104 contained in tape cartridge C 310 transmitting data in the form of an RF signal 309 to the auxiliary memory reader 232 when positioned in the presence of the RF field 304.

Figure 4:
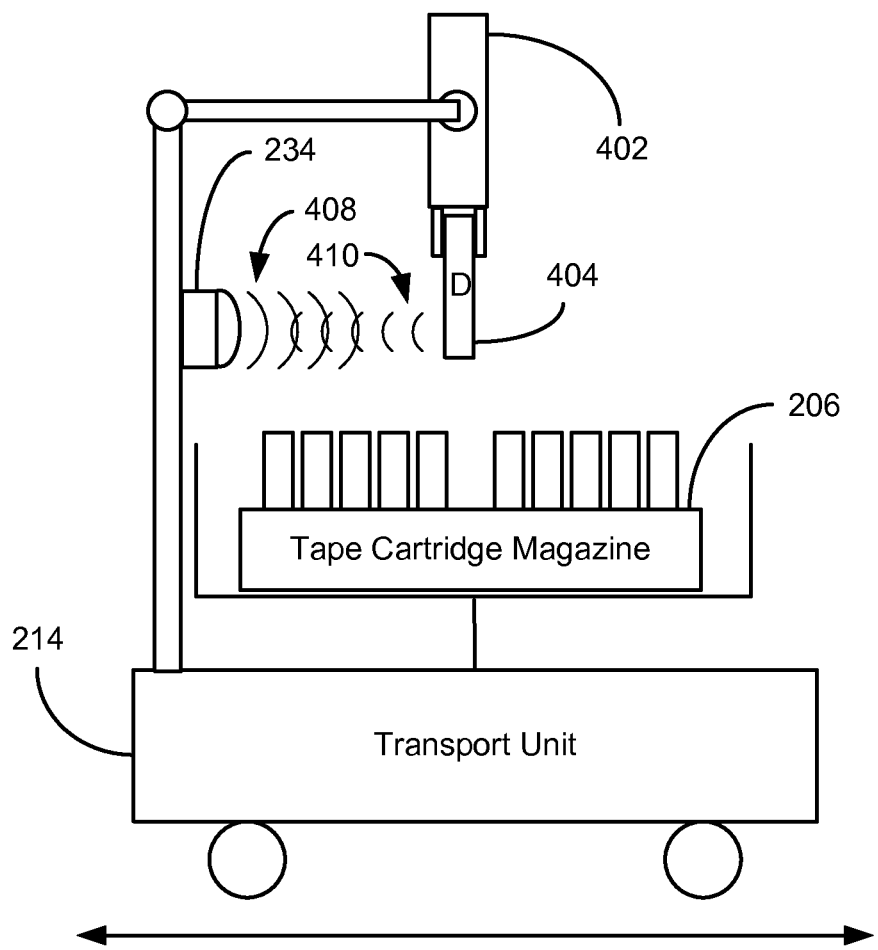
FIG. 4 is an illustration of a transport unit and auxiliary memory reader arrangement in accordance with an embodiment of the present invention.

With reference to FIG. 4, shown therein is an illustration of the transport unit 214, of FIG. 2A, in greater detail. The transport unit 214 is adapted to transport tape cartridge magazines 206 within the library 200. A cartridge picker 402, which can be associated with the transport unit 214, is adapted to move cartridges 100 from a tape cartridge magazine 206 into a cooperating read/write relationship with a tape drive, such as tape drive 224 of FIG. 2A. The transport unit 214 is illustratively shown herein accommodating an auxiliary memory reader 234 that is transmitting an RF signal 408 (and potentially data) to an auxiliary radio frequency memory device 104 contained in tape cartridge D 404 whereby the auxiliary radio frequency memory device 104 of cartridge D 404 is transmitting data via an RF signal 410 to the auxiliary memory reader 234.

Figure 5:
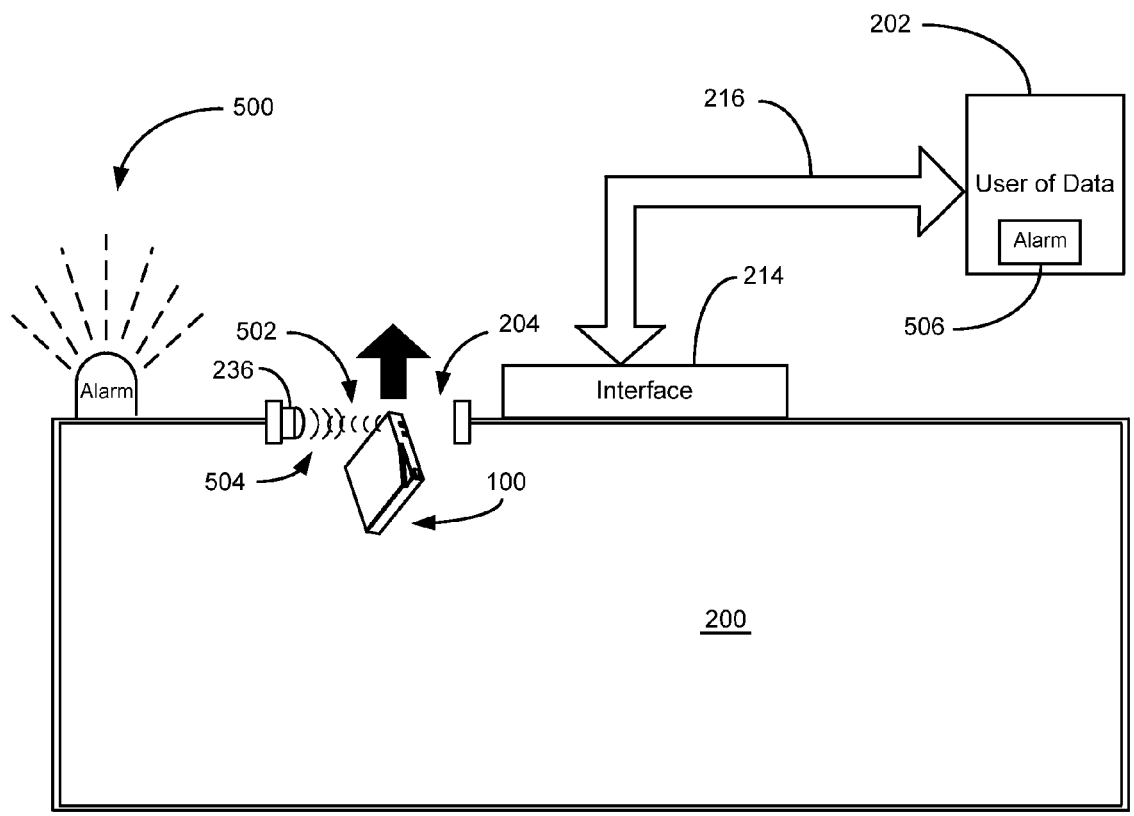
FIG. 5 shows an embodiment of an auxiliary radio frequency memory device reader located at the library entry/exit port location consistent with embodiments of the present invention.

FIG. 5 shows an embodiment of the present invention wherein an auxiliary radio frequency memory device reader 236 is capable of providing notice when a tape cartridge 100 is moved to an unintended location. In this embodiment, the library 200 provides an alarm system 500 that is activated when a tape cartridge 100 is moved to an unintended location, such as being moved out of the library 200 through the entry/exit port 204. As shown, the tape cartridge 100, and more specifically, the auxiliary radio frequency memory device 104 contained by the tape cartridge 100, transmits an RF response 502 when activated by the RF field 504 produced by the auxiliary radio frequency memory device reader 236. An algorithm associated with the library 200 can be initiated via the RF response 502 to determine if the tape cartridge 100 is authorized to pass through the entry/exit port 204. In the event of the tape cartridge 100 is displaced without authorization, the alarm 500 linked to the auxiliary radio frequency memory device reader 236 will activate. This measure can provide safeguard against stealing a tape cartridge 100 from the library 200 or inserting an unauthorized tape cartridge 100 having an auxiliary radio frequency memory device 104 into the library 200. In an alternative embodiment, the alarm 500 can be transmitted to a user of data 202 alerting that a tape cartridge 100 has been displaced without authorization. In yet another optional embodiment, one or more auxiliary radio frequency memory device readers (not shown) can be located in different places in or around the library 200 to indicate if a tape cartridge 100 is being moved to an unintended location. Such an arrangement can include a means to alert a user of data 202, or other authority, that something is out of order. In yet another embodiment, the auxiliary radio frequency memory device 104 associated with a tape cartridge can be marked as "moved without authorization" or "stolen", etc. Optionally, alternative data, such as history and/or performance data related to the cartridge 100 can be obtained during passing of the cartridge 100 by the reader 236.

Storage space on an auxiliary radio frequency memory device 104 is made available to a host, or user of data 202, in addition to space available for a drive device, such as tape drive 224, and tape cartridge 100. In some embodiments, the space for a host, referred to also as a host region, may contain attributes including, but not limited to, the date the media was generated, or manufactured, the time the cartridge was written (tape writing time), the time the cartridge was last accessed, a list of Single Character Display (SCD) at unload which is an indicia of potential errors with a drive and labeling field, such as a label tagged "Confidential Tape", library vital statistics, and other performance and/or historical event related data, for example. Library vital statistics can include data related to heat, humidity, voltage levels and the time of a certain activity level, etc.

In another embodiment of the present invention, a single bit of data, called a virgin bit, can be toggled in the auxiliary radio frequency memory device 104 when a tape cartridge 100 is used for the first time. A virgin bit can serve as an indicator that a tape has been used at least once which can reduce the number of new tape cartridges accidentally destroyed in the company of heavily used or damaged tape cartridges.

Data from each tape cartridge's auxiliary radio frequency memory device 104, obtained by an auxiliary radio frequency memory device reader, such as 230, 232, 234, or the like, can be stored on an auxiliary memory device 240 associated with the library 200. Optionally, the data can be stored in memory associated in an alternative location, such as with the host 202, for example. Because many potential attributes can be stored on an auxiliary radio frequency memory device 104, the manner in which the data can be displayed may be organized in accordance with specific needs. For example, each recorded cartridge can have an associated file where upon opening the file, one can choose which attribute to display. Alternatively, a display can include a handful of most frequently viewed data or data filtered according to specific performance related thresholds. Illustrative examples are shown in FIGS. 6A-6C.

Figure 6A:
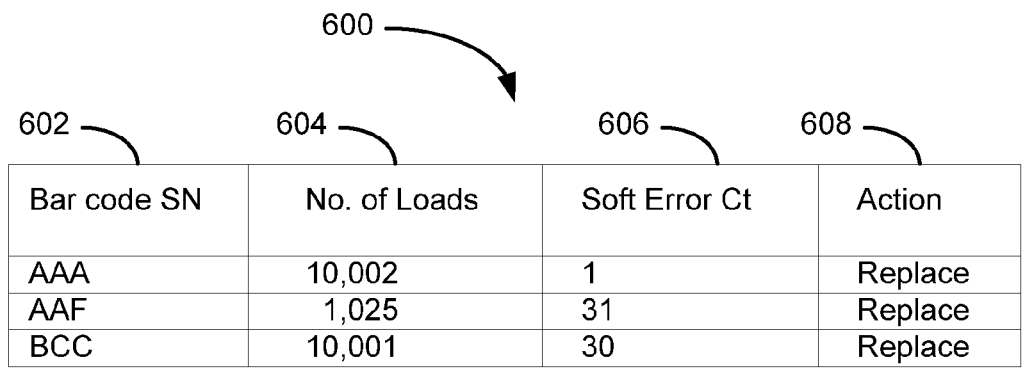

With reference to FIG. 6A, shown therein is one example of a displayed data table 600 pertaining to performance and historical event related information contained in an auxiliary radio frequency memory device 104 stored on an auxiliary memory device, such as device 240. The displayed data table 600 can be viewed on the graphical user interface 218 or, optionally, on a monitor accessible by a user of data 202, just to name two viewing examples. The data is sorted by an action to replace a cartridge 608 which, in this example, is either an exceeded threshold of number of loads or soft error count. As illustrated, four columns are displayed, namely; the tape cartridge bar code serial number 602, the number of times a tape cartridge is loaded 604, the number of soft errors counted in a tape 606 (performance related) and the action to replace a tape cartridge 608. Here, the number of loads that may alert a user of data 202 or a library operator is set at more than 10,000 times a tape cartridge 100 is loaded and threaded in a tape drive. Here, an excessive number of soft errors in which the number of times a tape drive has to rewrite a stream of data due to a read error (while writing) is set at a threshold of 30 soft errors. As illustratively shown, bar code serial number AAA has an action to be replaced because of an excess loads, i.e., 10,002. Bar code serial number AAF has an action to be replaced because of an excess of soft errors, i.e., 31. Bar code serial number BCC has an action to be replaced because of both an excess loads, i.e., 10,001, and an excess of soft errors, i.e., 30. A decision to replace the tape cartridge can be left up to an operator or end user or can optionally be automatically accomplished by the library 200.

Figure 6B:
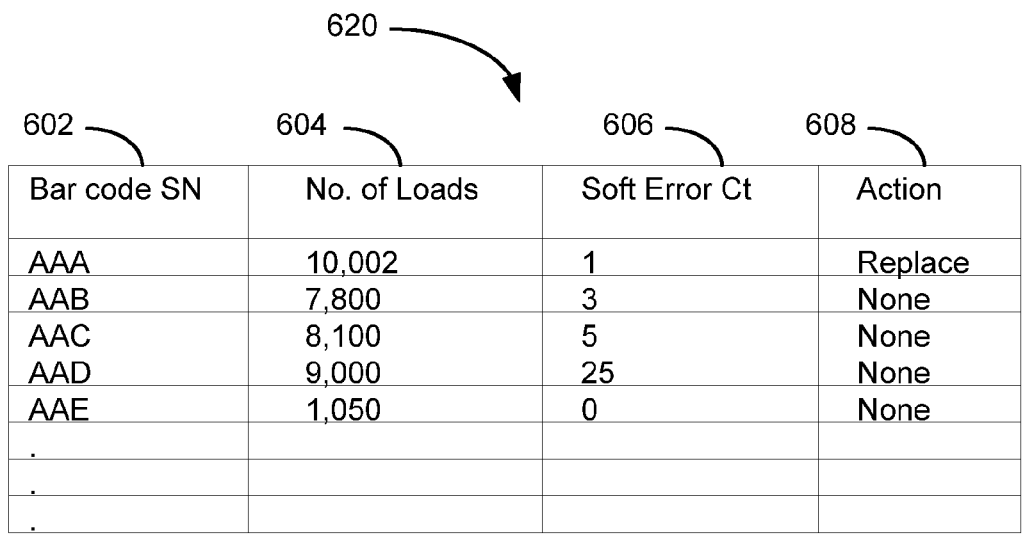

FIG. 6B shows an alternative example of a displayed data table 620 showing all tape cartridges in a library. As illustrated, four columns are displayed, namely; the tape cartridge bar code serial number 602, the number of times a tape cartridge is loaded 604, the number of soft errors counted in a tape 606 and the action to replace a tape cartridge 608. In this example, all of the bar code serial numbers of all the tapes 100 in a library 200 are displayed in succession in the bar code serial number column 602. As in FIG. 6A, cartridge bar code serial number AAA has 10,002 loads, 1 soft error count and has an action to be replaced due to excessive loads. Cartridge AAB has 7,800 loads a soft error count of 3 and there is no action needed regarding tape AAB. Likewise, tape cartridges AAC, AAD and AAE require no further action as their respective number of loads and soft error counts are under the threshold limits requiring further action.

FIG. 6C shows an alternative example of a displayed data table 640 showing just tape cartridge AAA and a list of SCD of four tape drives that are used with tape cartridge AAA. Not all tape drives provide an SCD, however some drives do, such as an IBM LTO-3 drive. As illustrated, five columns are displayed, namely; serial number AAA load count arranged in successive loads 642, drive-1 load status 644, drive-2 load status 646, drive-3 load status 648 and drive-4 load status 650. As illustrated for loads 2, 5 and 8, drive-3 is registering error 6 which may be a tape drive or media error displayed by drive-3. As such, an operator or user of data may arrive at the conclusion that drive-3 is broken or may need servicing. The registered SCD of 0 indicates that no error occurred.

Figure 7:
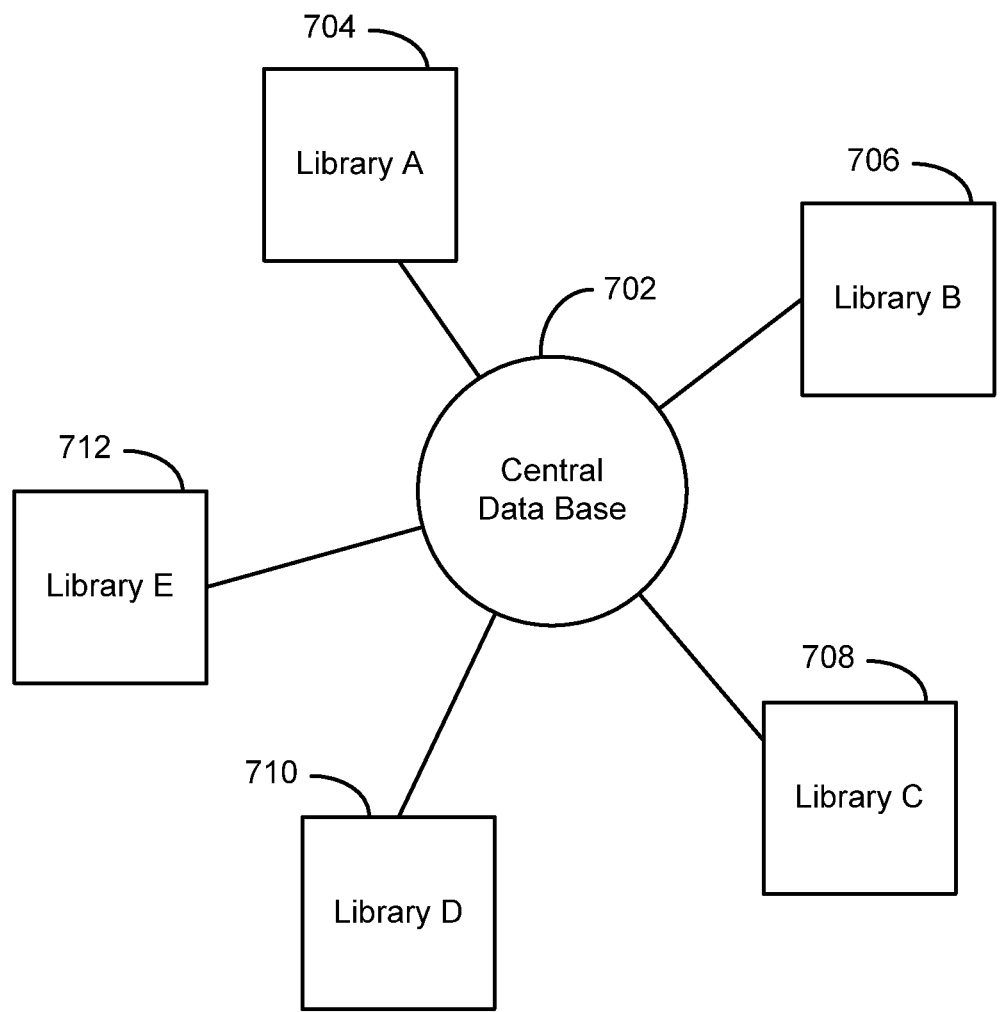
FIG. 7 is a block diagram illustrating a central data base acting as a repository for information pertaining to a plurality of tape cartridges in a plurality of libraries in accordance with an embodiment of the present invention.

FIG. 7 is a block diagram illustrating a central data base 702 acting as a repository for information pertaining to at least some of the tape cartridges associated with each library. As shown in the illustrative arrangement, library A 704, B 706, C 708, D 710 and E 712 are each linked to the central data base 702. The central data base 702 can provide storage of any, and all, auxiliary radio frequency memory device information contained in each tape cartridge associated with each library A-E 704-712. In one embodiment, all of the tape cartridges comprised by library A 704 may each comprise an auxiliary radio frequency memory device, such as the device 104. The central data base 702 can, therefore, contain all of the information from each of the auxiliary radio frequency memory devices from library A 704 and further be adapted to sort the information in any number of ways including the exemplary arrangements of FIGS. 6A-6C. Library B 706 may comprise tape cartridges that do not have an auxiliary radio frequency memory device, thus, only those that do have an auxiliary radio frequency memory device can store associated information on the central data base 702. Library C 708 may include some cartridges with an attribute associated with each auxiliary radio frequency memory device that bars storing any associated information on the central data base 702, hence, only those cartridges that are allowed to be stored (i.e., not barred) on the central data base 702 are stored. The auxiliary radio frequency memory device information stored on the central data base can be viewed by an authority, such as an Original Equipment Manufacturer of libraries and/or tapes, for purposes of tape management, such as replacing damaged or worn out tapes or notifying a user of data if something out of the ordinary has occurred.

Figure 8:
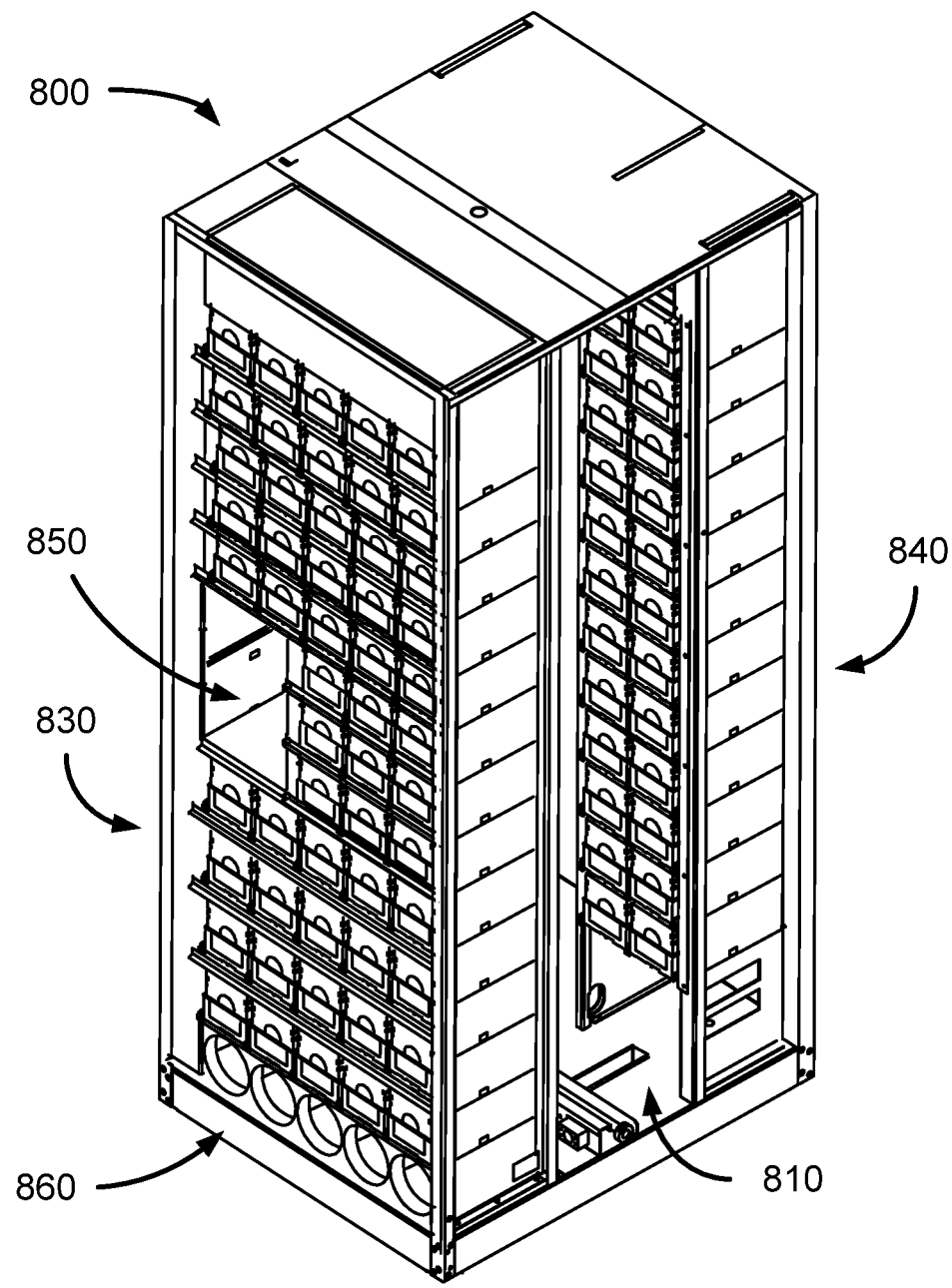
FIG. 8 shows a commercial embodiment of one T-950 library unit wherein aspects of the present invention can be practiced.

Embodiments of the present invention can be commercially practiced in a Spectra Logic T-950 tape cartridge library manufactured by Spectra Logic of Boulder Colo. FIG. 8 shows a commercial embodiment of one T-950 unit 800 without an enclosure. The T-950 library 800 comprises a first and second shelf system 830 and 840 that are adapted to support a plurality of the mobile media, such as the tape cartridge magazine 206 comprising a plurality of LTO-3 tape cartridges with MAMs, archived by the library 800. The shelf systems 830 and 840 can each comprise at least one auxiliary memory reader, such as the auxiliary memory reader 232 of FIG. 2A. Furthermore, the second shelf system 840 comprises at least one drive (not shown) adapted to read and write data to and from a tape cartridge. Functionally interposed between the first and second shelf system 830 and 840 is a magazine transport space 810. The magazine transport space 810 is adapted to provide adequate space for a tape cartridge magazine 206 to be moved, via a magazine transport and cartridge picker (not shown), from a position in the first shelf system 830, for example, to a drive. The magazine transport and picker can further accommodate at least one auxiliary radio frequency memory device reader, such as the reader 234 from FIG. 2A. Tape cartridge magazines 206 can be transferred into and out from the T-950 library 800 via an entry/exit port 850. An auxiliary radio frequency memory device reader, such as the reader 236 from FIG. 2A, can be associated with the entry/exit port 850. Transferring tape cartridge magazines 206 in and out of the T-950 library 800 can be accomplished by an operator for example. The T-950 library 800 comprises a means for cooling as shown by the fans 860, located at the base of the library 800. The T-950 library 800 can be linked to a central data base, such as the data base 702, wherein the central data base can provide storage of all of the auxiliary radio frequency memory devices, such as the device 104, contained in each tape cartridge in the T-950 library 800 as read by any one of the auxiliary radio frequency memory device readers. The T-950 library 800 also provides a graphical user interface (not shown) whereon a display table much like those illustrated in FIGS. 6A-6C can be displayed. In an alternative embodiment, simple messages pertaining to action associated with a tape cartridge can be displayed, such as an alert accompanying a sound alarm, for example.

Figure 9:
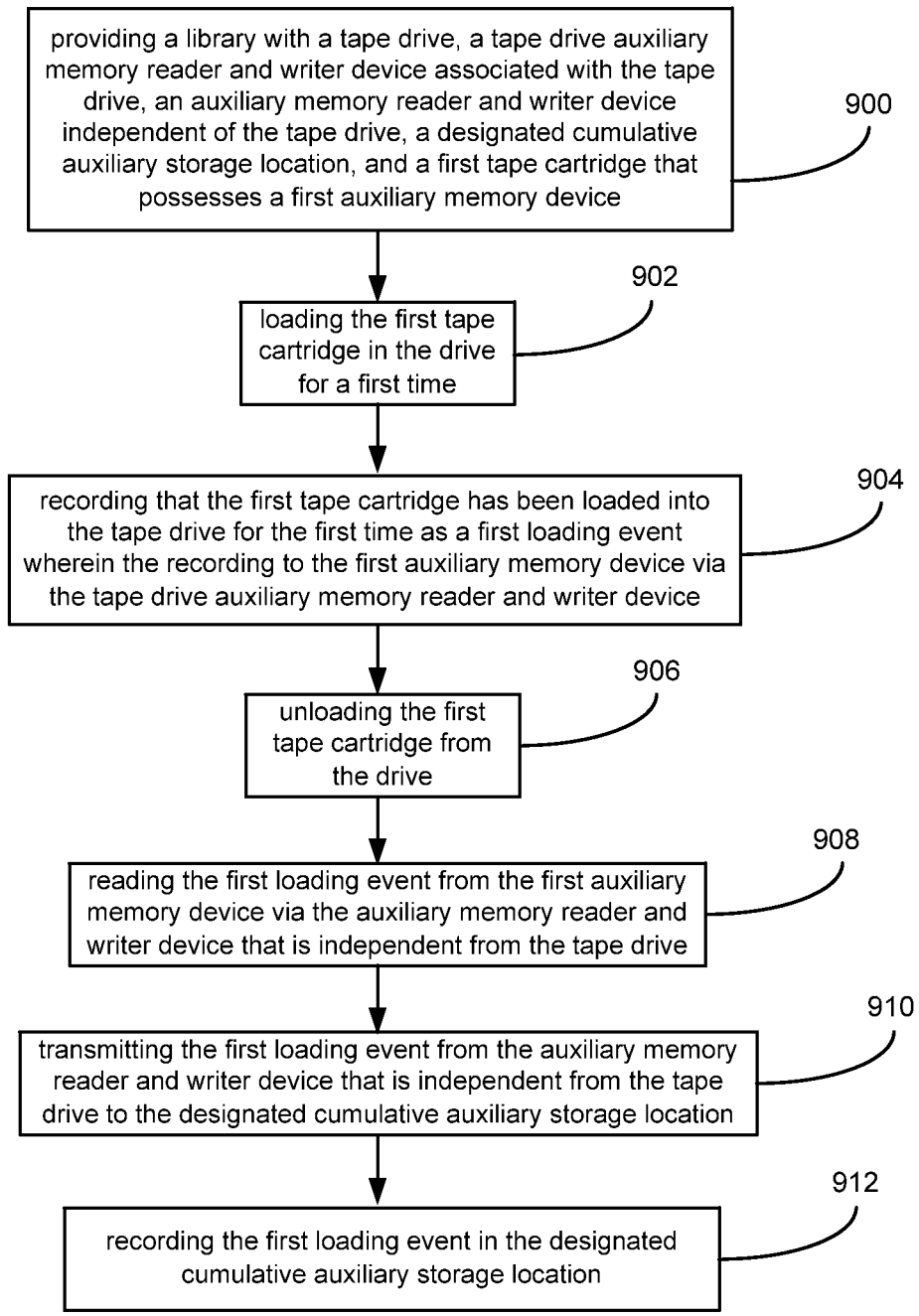
FIG. 9 is a block diagram illustrating a method to practice an embodiment of the present invention.

Referring now to FIG. 9 in conjunction with FIG. 2A, shown therein is a method to practice an embodiment of the present invention. It should be recognized that the steps presented in the described embodiments of the present invention do not necessarily require any particular sequence unless otherwise stated. As shown in step 900, a library 200 is provided with a tape drive 224, a tape drive auxiliary memory reader and writer device 230 associated with the tape drive 224, an auxiliary memory reader device that is independent from the tape drive, such as device 232 or 234, for example, a designated cumulative auxiliary storage location 240, and a first tape cartridge 201 that possesses a first auxiliary memory device 104. In an optional embodiment, the auxiliary memory reader device that is independent from the tape drive can also be capable of writing data to the first auxiliary memory device 104 associated with the first tape cartridge 201. As shown in step 902, the first tape cartridge 201 is loaded in the drive 224 for a first time. A tape cartridge prior to loading in the drive 224 in the tape library 200 for the first time is considered a virgin tape cartridge. As shown in step 904, a "first loading event" is stored to the first auxiliary memory device 104 associated with the tape cartridge 201 via the tape drive auxiliary memory reader and writer device 230. In one embodiment, record of the "first loading event" can be in the form of a single bit, or virgin bit, toggled to indicate the event occurred. As shown in steps 906 and 908, respectively, the first tape cartridge 201 is unloaded from the tape drive 224 followed by reading that the "first loading event" occurred from the first auxiliary memory device 104 via the auxiliary memory reader device that is independent from the tape drive, such as the reader 234 or 232. Once the "first loading event" has been read from the first auxiliary memory device 104, the information that the event took place is transmitted to the designated cumulative auxiliary storage location, as shown in step 910. As shown in step 912, a record that the first loading event took place relative the first tape cartridge 201 is stored in the designated cumulative auxiliary storage location 240. In one embodiment of the method, the steps 900-912 are in order. It should be clear that the reading event of step 908 does not have to occur immediately after the step 906 of unloading the tape cartridge 201; for example, a large amount of time with intervening activity can occur between steps 908, 910 and 912. In an alternative embodiment of the present invention, a second tape cartridge (or more) containing a second auxiliary memory device can progress through steps 900-912 as well with recordation that the second tape cartridge has been used at least once.

Figure 10:
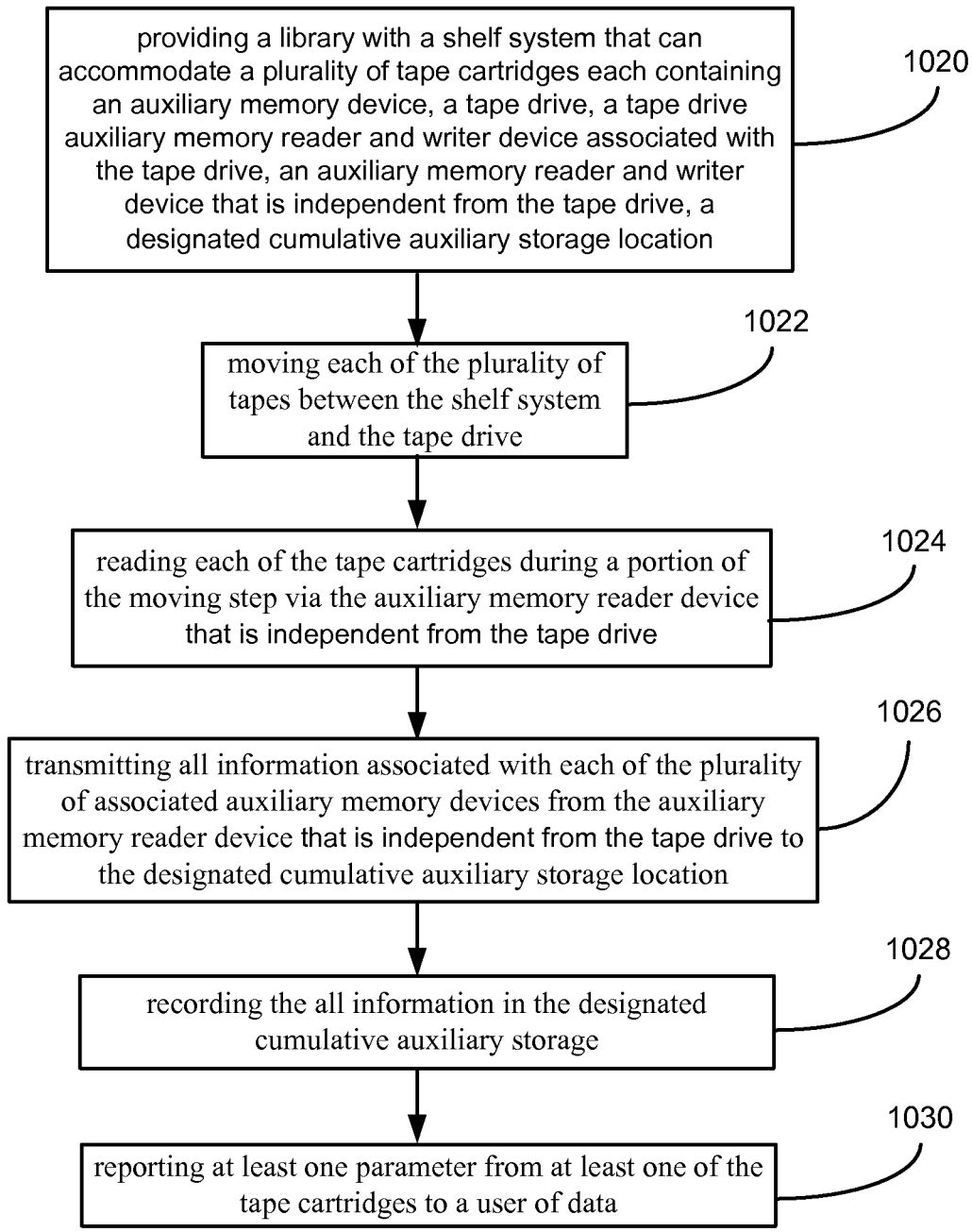
FIG. 10 is a block diagram illustrating an alternative method to practice an embodiment of the present invention.

FIG. 10 shows an alternative method that can add to the method of FIG. 9 or can stand alone. As shown in step 1020, the tape library 200 can be provided with a shelf system 220 wherein the shelf system 220 accommodates a plurality of tape cartridges, such as cartridge 100, wherein each of the tape cartridges 100 possesses an associated auxiliary memory device, such as device 104. As shown in step 1022, each of the plurality of tape cartridges 100 is moved between the shelf system 220 and the tape drive 224 or 222. As shown in step 1024, each of the tape cartridges 100 is read during a portion of the moving step 1022 via the auxiliary memory reader device that is independent from the tape drive, such as device 232 or 234. As shown in steps 1026 and 1028, respectively, all information associated with each of the plurality of associated auxiliary memory devices from each of the tape cartridges 100 is reported from the auxiliary memory reader device that is independent from the tape drive, such as devices 232, 234 and/or 236, to the designated cumulative auxiliary storage location 240 where the information can be recorded. As shown in step 1030, at least one parameter from at least one of the tape cartridges is reported to a user of data 202. The at least one reported parameter can be associated with a parameter such as a performance and/or historical event that has a related threshold limit such that when the threshold limit is reached an alert message is also reported to the user of data 202.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple auxiliary memory reader devices that are independent from the tape drive can be used inside of a library with one or more tape cartridge's associated auxiliary memory device at the same time while still maintaining substantially the same functionality without departing from the scope and spirit of the present invention. Another example can include using auxiliary memory reader devices that are independent from the tape drive to check accuracy of data via redundancy not to mention techniques in which data from multiple tape cartridges, via their associated auxiliary memory devices, can be accumulated coincidentally, just to name a few examples while still maintaining substantially the same functionality without departing from the scope and spirit of the present invention. Further, though elements and methods are described herein exemplifying a first and second object or element, for example, this language is used herein to simplify the description indicative of a plurality of objects or elements. Finally, although the preferred embodiments described herein are directed to tape library systems and RF devices, and related technology, it will be appreciated by those skilled in the art that the teachings of the present invention can be applied to other remote communication systems and devices, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A tape storage library comprising:
    a plurality of tape cartridges each including an associated auxiliary memory device;
    a first tape drive and a second tape drive substantially disposed in said tape storage library wherein the first tape drive and the second tape drive each provide a Single Character Display that displays a functional status value of each interaction defined by a physical engagement between one of said tape cartridges and one of said tape drives;
    a data base adapted to maintain records of said functional status value respecting each of said interactions;
    a reader and writer device that operates independently of the tape drives and is capable of reading information from and writing information to a selected auxiliary memory device after a selected interaction is ended, and is further capable of updating the functional status records to include the selected interaction based on said functional status value corresponding to said Single Character Display.

2. The tape storage library of claim 1 wherein said first tape drive and said second tape drive each possess another reader and writer device adapted to transfer said information to said selected auxiliary memory devices during the interaction.

3. The tape storage library of claim 1 wherein said functional status records include incidences when there is an error associated with said interaction.

4. The tape storage library of claim 3 comprising a reporting system that is adapted to report a tape drive health condition as problematic if a threshold is reached of accumulated errors.

5. The tape storage library of claim 4 wherein said reporting system is adapted to report said tape drive health condition when said threshold of accumulated errors is reached for either said first tape drive or said second tape drive.

6. The tape storage library of claim 3 comprising a reporting system that is adapted to report a tape drive health condition as problematic when said error is of a type having a predetermined level of severity.

7. The tape storage library of claim 1 wherein said data base is adapted to receive information respecting each of a plurality of interactions from either said first tape drive or said second tape drive.

8. The tape storage library of claim 1 wherein said data base is adapted to receive information respecting each of a plurality of interactions from each of said auxiliary memory devices.

9. The tape storage library of claim 1 wherein each of said auxiliary memory devices comprises radio frequency auxiliary memory devices.

10. The tape storage library of claim 1 further comprising a third tape drive.

11. The tape storage library of claim 1 further comprising a display device adapted to be viewed by an end user and a reporting system that is adapted to report a tape drive health condition via said display device.

12. The tape storage library of claim 1 comprising a data analysis system that includes a computer central processing unit and a storage device including electronically stored, readable, and executable instructions in the form of an algorithm adapted to be read and executed via said computer central processing unit.

13. The tape storage library of claim 12 wherein said analysis includes tallying said interactions that contain errors.

14. The tape storage library of claim 13 wherein said analysis includes further tallying said interactions that are free of errors.

15. A method comprising:
providing a tape library including a plurality of tape cartridges each including an auxiliary memory, a plurality of tape drives, and a data base;
forming an interaction between a selected tape cartridge and one of said tape drives wherein said interaction is defined by a physical engagement between the selected tape cartridge and said one tape drive;
during the interaction, assessing a functional status associated with said interaction;
ending the interaction by physically disengaging the selected tape cartridge from said tape drive; and
after ending the interaction, using a reader and writer device that operates independently of said tape drives and is capable of writing information to and reading information from the auxiliary memory of the selected tape cartridge to update the data base to include the functional status of the interaction.

16. The method of claim 15 comprising correlating a plurality of functional statuses in the data base that are characterized in that they deviate from a trouble-free interaction wherein said trouble-free interaction is defined as when said interaction is devoid of any unexpected errors.

17. The method of claim 16 further comprising taking action in response to said correlation by either disabling one of said tape drives, replacing one of said tape drives, disabling one of tape cartridges, or replacing one of said tape cartridges.

18. The method of claim 15 further comprising during the interaction writing information about the assessment to an auxiliary memory device in said selected tape cartridge and after ending the interaction reading the information from the auxiliary memory and transferring the information to create a record of the functional status in the data base.

19. The method of claim 15 further comprising providing a single character display provided by at least one of said tape drives and displaying said first functional status on said display.

20. A tape library comprising:
a plurality of tape drives and a plurality of tape cartridges substantially disposed in said tape library;
a database including a plurality of interaction records stored in memory and corresponding to a plurality of respective interaction events between any of said tape cartridges and any of said tape drives when physically engaged, and wherein each of said stored interaction records includes a tape drive indicia associated with one of said tape drives, a tape cartridge indicia associated with one of said tape cartridges, and a functional status indicator that by reading an interaction record directly indicates whether a replace action is warranted for at least one of the tape cartridges and the tape drives.

21. The tape library of claim 20 further comprising a visually observable report showing a table listing of said functional statuses for said interaction events involving each of said tape drives.

22. The tape library of claim 20 where each of said tape cartridges possesses an auxiliary memory device that maintains a record of said tape drive indicia and said functional status for at least one interaction event associated with said associated tape cartridge.

23. The tape library of claim 20 further comprising a means for alerting an end user when said interaction assessment records indicate that the functional status of said interaction events involving any one of said tape drives deviates from an expected, predetermined outcome.

24. A tape library comprising a data table stored in memory to record results of interactions between a selected tape cartridge and each of a plurality of tape drives, said library storing in the data table only a first single character for each interaction involving a data transfer error between the tape cartridge and the respective tape drive, and storing in the data table only a different second single character for each interaction not involving a data transfer error between the tape cartridge and the respective tape drive.

* * * * *